(12) United States Patent
Pang et al.

(10) Patent No.: US 10,718,992 B2
(45) Date of Patent: Jul. 21, 2020

(54) CAMERA MODULE AND PORTABLE ELECTRONIC DEVICE

(71) Applicant: Samsung Electro-Mechanics Co., Ltd., Suwon-si (KR)

(72) Inventors: Sung Man Pang, Suwon-si (KR); Youn Joong Lee, Suwon-si (KR); Je Hyeon Yu, Suwon-si (KR); Kwang Mook Lee, Suwon-si (KR); Myeung Su Kim, Suwon-si (KR); Jin Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 26 days.

(21) Appl. No.: 16/353,415

(22) Filed: Mar. 14, 2019

(65) Prior Publication Data

US 2019/0324348 A1    Oct. 24, 2019

(30) Foreign Application Priority Data

Apr. 24, 2018  (KR) .................. 10-2018-0047218
Jul. 10, 2018  (KR) .................. 10-2018-0080216

(51) Int. Cl.
*G03B 5/02* (2006.01)
*G02B 27/64* (2006.01)
*H02K 41/035* (2006.01)
*H02K 11/225* (2016.01)
*H04N 5/232* (2006.01)
*H02K 11/40* (2016.01)

(52) U.S. Cl.
CPC ............. *G03B 5/02* (2013.01); *G02B 27/646* (2013.01); *H02K 11/225* (2016.01); *H02K 11/40* (2016.01); *H02K 41/0356* (2013.01); *H04N 5/23287* (2013.01); *H04N 5/23293* (2013.01); *G03B 2205/0015* (2013.01); *G03B 2205/0069* (2013.01)

(58) Field of Classification Search
CPC .............. G03B 5/02; G03B 2205/0015; G03B 2205/0069; H02K 11/40; H02K 11/225; H02K 41/0356; H04N 5/23293; H04N 5/23287; G02B 27/646; H02P 1/00
See application file for complete search history.

(56) References Cited

U.S. PATENT DOCUMENTS 4,734,624 A * 3/1988 Nagase .............. H05B 41/2928
                                                 315/174
9,661,198 B2   5/2017 Macours et al.
(Continued)

FOREIGN PATENT DOCUMENTS

KR        10-1166418 B1     7/2012
KR    10-2013-0077216 A     7/2013

*Primary Examiner* — Jason A Flohre
(74) *Attorney, Agent, or Firm* — NSIP Law

(57) ABSTRACT

A camera module includes a lens barrel, a driving coil disposed to face a target detection unit prepared on one side of the lens barrel, a driving device configured to provide a driving signal to the driving coil, and a position calculating unit including a first capacitor, configured to provide a ground for an alternating current (AC) signal to the driving coil, a second capacitor, connected to the driving coil to constitute oscillation circuit together with the driving coil, and a position calculating circuit configured to calculate a position of the lens barrel from a frequency of the oscillation circuit.

18 Claims, 13 Drawing Sheets

(56) References Cited

U.S. PATENT DOCUMENTS

| | | | |
|---|---|---|---|
| 2009/0096383 A1* | 4/2009 | Park | H02P 8/12 |
| | | | 315/276 |
| 2010/0164533 A1* | 7/2010 | Marshall | G01R 31/2617 |
| | | | 324/762.01 |
| 2016/0039613 A1* | 2/2016 | Bott | G05D 19/02 |
| | | | 198/751 |
| 2017/0324906 A1* | 11/2017 | Kang | H04N 5/23287 |
| 2018/0252893 A1* | 9/2018 | Park | H04N 5/2254 |
| 2019/0132532 A1* | 5/2019 | Tabuchi | H04N 5/23212 |

* cited by examiner

CAMERA MODULE AND PORTABLE ELECTRONIC DEVICE

CROSS-REFERENCE TO RELATED APPLICATIONS

This application claims the benefit under 35 USC 119(a) of Korean Patent Application Nos. 10-2018-0047218 filed on Apr. 24, 2018, and 10-2018-0080216 filed on Jul. 10, 2018, in the Korean Intellectual Property Office, the entire disclosures of which are incorporated herein by reference for all purposes.

BACKGROUND

1. Field

This application relates to a camera module and a portable electronic device.

2. Description of the Background

Recently, portable communications terminals such as cellular phones, personal digital assistants (PDAs), portable personal computers (PCs), or the like, have generally been implemented with the ability to perform the transmission of video data as well as the transmission of text or audio data. In accordance with such a trend, camera modules have recently been standardly installed in portable communications terminals in order to enable the transmission of the video data, video chatting, and the like.

Generally, a camera module includes a lens barrel having lenses disposed therein, a housing accommodating the lens barrel therein, and an image sensor converting an image of a subject into an electrical signal. A single focus type camera module capturing an image of a subject with a fixed focus may be used as the camera module. However, recently, in accordance with technological development, a camera module including an actuator enabling autofocusing (AF) has been used. In addition, such a camera module may include an actuator for an optical image stabilization (OIS) function to suppress a resolution decrease phenomenon due to handshake.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel, a driving coil disposed to face a target detection unit disposed on one side of the lens barrel, a driving device configured to provide a driving signal to the driving coil, and a position calculating unit including a first capacitor including a ground for an alternating current (AC) signal to the driving coil, a second capacitor connected to the driving coil to constitute an oscillation circuit together with the driving coil, and a position calculating circuit configured to calculate a position of the lens barrel from a frequency of the oscillation circuit.

The first capacitor may be connected in parallel to the driving coil.

The first capacitor may include two first capacitors, and one of the two first capacitors may be connected between one end of the driving coil and a ground, and the other first capacitor may be connected between the other end of the driving coil and the ground.

The second capacitor may be disposed between a tap terminal of the driving coil and a ground.

The position calculating circuit may include an oscillation maintaining unit configured to maintain oscillation of the oscillation circuit.

The oscillation circuit may include a resistor component, an inductor component, and a capacitor component connected in parallel.

The resistor component of the oscillation circuit may correspond to at least one of an equivalent resistor component of the driving coil and a parasitic resistor component of a branch in which the driving coil is disposed.

The oscillation maintaining unit may include an amplifier configured to amplify an oscillation signal of the oscillation circuit.

The amplifier may include a transconductance gain satisfying $gm \geq 1/Rp$, where $gm$ denotes a transconductance gain, and $Rp$ denotes the resistor component of the oscillation circuit.

A portable electronic device may include the camera module, which may further include an image sensor configured to convert light incident through the lens barrel to an electrical signal, and a display unit disposed on a surface of the portable electronic device to display an image based on the electrical signal.

In another general aspect, a camera module includes a lens barrel, a driving coil disposed to face a target detection unit disposed on one side of the lens barrel, a driving device including a driving circuit unit including a plurality of transistors connected to the driving coil, and a control unit configured to provide a control signal to a gate of each of the plurality of transistors, and a position calculating unit including a first capacitor connected to the driving coil in parallel, and a second capacitor disposed between a tap terminal of the driving coil and a ground, the position calculating unit configured to calculate a position of the lens barrel according to a variation in inductance of the driving coil in response to movement of the target detection unit.

The first capacitor may include a ground for an alternating current (AC) signal to the driving coil.

The first capacitor may constitute an oscillation circuit together with the driving coil.

The position calculating unit may detect a variation in inductance of the driving coil in response to a frequency of the oscillation circuit.

The position calculating unit may amplify an oscillation signal of the oscillation circuit to maintain oscillation of the oscillation circuit.

The plurality of transistors may be connected to both ends of the driving coil in the form of an H bridge circuit.

The position calculation unit may calculate a position of the lens barrel in response to a variation in inductance of the driving coil in a period in which the control signal is applied to a gate of each of the plurality of transistors.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
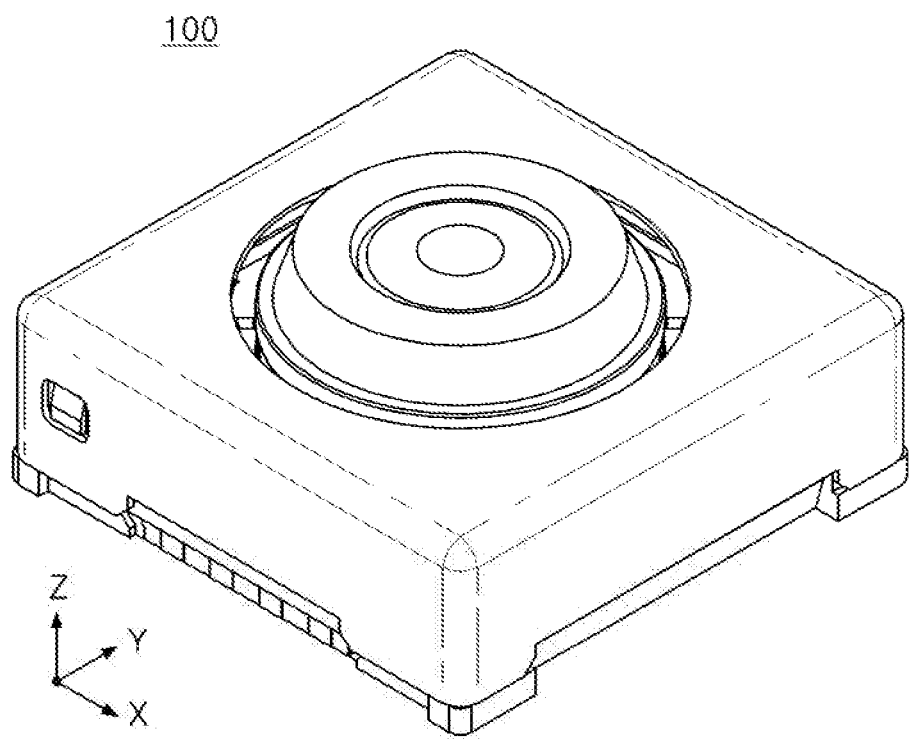
FIG. 1 is a perspective view illustrating a camera module according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

The examples described herein relate to a camera module and a portable electronic device such as, but not limited to, a mobile telecommunications terminal, smartphone, and tablet PC. An aspect of the present disclosure may provide a camera module capable of precisely detecting a position of a magnet without the use of a Hall sensor FIG. 1 is a perspective view illustrating a camera module according to one or more examples described herein, and FIG. 2 is a schematic exploded perspective view illustrating the camera module according to one or more examples.

Figure 2:
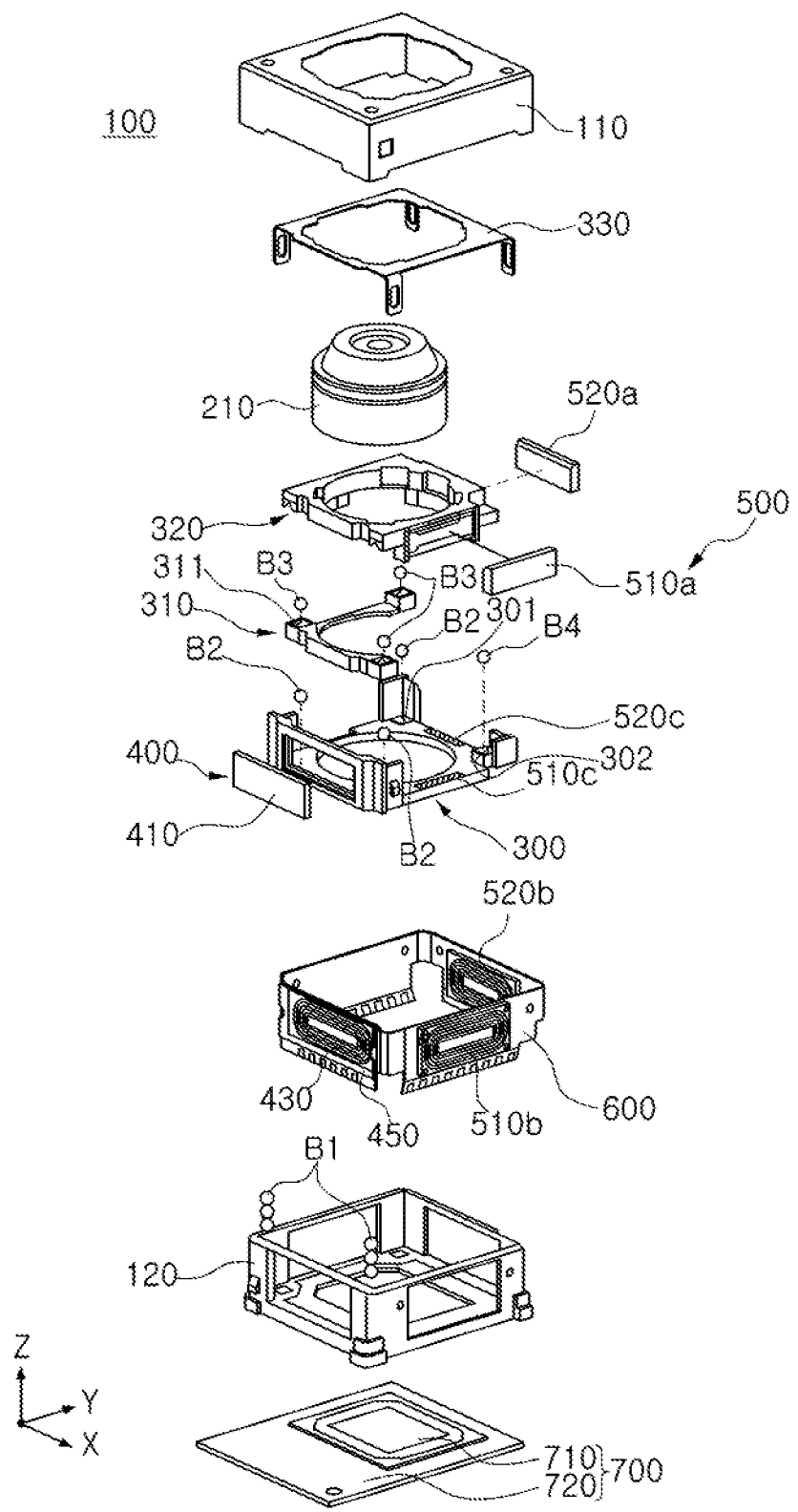
FIG. 2 is a schematic exploded perspective view illustrating the camera module according to one or more examples.

Referring to FIGS. 1 and 2, a camera module 100 in the examples described herein may include a lens barrel 210 and an actuator moving the lens barrel 210. In addition, the camera module 100 may include a case 110 and a housing 120 accommodating the lens barrel 210 and the actuator therein, and may further include an image sensor module 700 converting light incident thereto through the lens barrel 210 into an electrical signal.

The lens barrel 210 may have a hollow cylindrical shape so that a plurality of lenses capturing an image of a subject may be accommodated therein, and the plurality of lenses may be mounted in the lens barrel 210 along an optical axis. The number of lenses disposed in the lens barrel 210 may depend on a design of the lens barrel 210, and the respective lenses may have optical characteristics such as the same refractive index or different refractive indices, or the like.

The actuator may move the lens barrel 210. As an example, the actuator may move the lens barrel 210 in an optical axis (Z-axis) direction to focus the lenses, and may move the lens barrel 210 in a direction perpendicular to the optical axis (the Z axis) to correct hand-shake at the time of capturing an image. The actuator may include a focusing unit 400 focusing the lenses and a hand-shake correction unit 500 correcting the shake.

The image sensor module 700 may convert the light incident thereto through the lens barrel 210 into the electrical signal. As an example, the image sensor module 700 may include an image sensor 710 and a printed circuit board 720 connected to the image sensor 710, and may further include an infrared filter. The infrared filter may cut off light in an infrared region in the light incident thereto through the lens barrel 210. The image sensor 710 may convert the light incident thereto through the lens barrel 210 into the electrical signal. As an example, the image sensor 710 may include a charge coupled device (CCD) or a complementary metal oxide semiconductor (CMOS). The electrical signal converted by the image sensor 710 may be output as an image through a display unit of a portable electronic device. The image sensor 710 may be fixed to the printed circuit board 720, and may be electrically connected to the printed circuit board 720 by wire bonding.

The lens barrel 210 and the actuator may be accommodated in the housing 120. As an example, the housing 120 may have a shape of which the top and the bottom are opened, and the lens module 210 and the actuator may be accommodated in an internal space of the housing 120. The image sensor module 700 may be disposed on the bottom of the housing 120.

The case 110 may be coupled to the housing 120 to surround external surfaces of the housing 120, and may protect internal components of the camera module 100. In addition, the case 110 may shield electromagnetic waves. As an example, the case 110 may shield electromagnetic waves generated from the camera module so that the electromagnetic waves do not have an influence on other electronic components in the portable electronic device.

As described above, the actuator may include the focusing unit 400 focusing the lenses and the hand-shake correction unit 500 correcting the shake.

The focusing unit 400 may include a magnet 410 and a driving coil 430 generating driving force to move the lens barrel 210 and a carrier 300 accommodating the lens barrel 210 therein in the optical axis (Z-axis) direction.

The magnet 410 may be mounted on the carrier 300. As an example, the magnet 410 may be mounted on one surface of the carrier 300. The driving coil 430 may be mounted on the housing 120, and may be disposed to face the magnet 410. As an example, the driving coil 430 may be disposed on one surface of a substrate 600, and the substrate 600 may be mounted on the housing 120.

The magnet 410 may be mounted on the carrier 300 to move in the optical axis (Z-axis) direction together with the carrier 300, and the driving coil 430 may be fixed to the housing 120. However, according to another example, positions of the magnet 410 and the driving coil 430 may be exchanged with each other. When a driving signal is applied to the driving coil 430, the carrier 300 may be moved in the optical axis (Z-axis) direction by electromagnetic interaction between the magnet 410 and the driving coil 430.

Since the lens barrel 210 is accommodated in the carrier 300, the lens barrel 210 may also move in the optical axis (Z-axis) direction by the movement of the carrier 300. In addition, since a frame 310 and a lens holder 320 are accommodated in the carrier 300, the frame 310, the lens holder 320, and the lens barrel 210 may also be moved together in the optical axis (Z-axis) direction by the movement of the carrier 300.

Rolling members B1 may be disposed between the carrier 300 and the housing 120 to reduce a frictional force between the carrier 300 and the housing 120 when the carrier 300 is moved. Each of the rolling members B1 may have a ball shape. The rolling members B1 may be disposed on both sides of the magnet 410.

A yoke 450 may be disposed on the housing 120. As an example, the yoke 450 may be mounted on the substrate 600 and be disposed on the housing 120. The yoke 450 may be provided on another surface of the substrate 600. Therefore, the yoke 450 may be disposed to face the magnet 410 with the driving coil 430 interposed therebetween. An attractive force may act in the direction perpendicular to the optical axis (Z-axis) between the yoke 450 and the magnet 410. Therefore, the rolling members B1 may remain in contact with the carrier 300 and the housing 120 due to the attractive force between the yoke 450 and the magnet 410. In addition, the yoke 450 may collect magnetic force of the magnet 410 to prevent generation of leakage flux. As an example, the yoke 450 and the magnet 410 may form a magnetic circuit.

In the examples described herein, a closed loop control manner of sensing and feeding back a position of the lens barrel 210 may be used in a focusing process. Therefore, a position calculating unit may be provided for closed loop control. The position calculating unit may detect the position of the lens barrel 210.

The hand-shake correction unit 500 may be used to correct image blurring or moving picture shaking due to a factor such as hand-shake of a user at the time of capturing an image or a moving picture. For example, when the hand-shake is generated at the time of capturing the image due to the hand-shake of the user, or the like, the hand-shake correction unit 500 may compensate for the hand-shake by allowing the lens barrel 210 to be relatively displaced to correspond to the shake. As an example, the hand-shake correction unit 500 may move the lens barrel 210 in the direction perpendicular to the optical axis (the Z axis) to correct the shake.

The hand-shake correction unit 500 may include a plurality of magnets 510a and 520a and a plurality of driving coils 510b and 520b generating driving force to move a guide member in the direction perpendicular to the optical axis (the Z axis). The frame 310 and the lens holder 320 may be inserted into the carrier 300, be disposed in the optical axis (Z-axis) direction, and guide the movement of the lens barrel 210. The frame 310 and the lens holder 320 may have a space into which the lens barrel 210 may be inserted. The lens barrel 210 may be inserted and fixed into the lens holder 320.

The frame 310 and the lens holder 320 may be moved in the direction perpendicular to the optical axis (the Z-axis) relative to the carrier 300 by the driving force generated by the plurality of magnets 510a and 520a and the plurality of driving coils 510b and 520b. Among the plurality of magnets 510a and 520a and the plurality of driving coils 510b and 520b, some magnets 510a and some driving coils 510b may generate driving force in a first axis (Y-axis) direction perpendicular to the optical axis (the Z-axis), and the other magnets 520a and the other driving coils 520b may generate driving force in a second axis (X-axis) direction perpendicular to a first axis (a Y-axis). Here, a second axis (an X axis) refers to an axis perpendicular to both of the optical axis (the Z axis) and the first axis (the Y axis). The plurality of magnets 510a and 520a may be disposed to be orthogonal to each other on a plane perpendicular to the optical axis (the Z axis). As such, the direction perpendicular to the optical axis (the Z axis) that the frame 310 and the lens holder 320 may be moved in to correct the shake may be in any direction perpendicular to the optical axis (the Z axis).

The plurality of magnets 510a and 520a may be mounted on the lens holder 320, and the plurality of driving coils 510b and 520b facing the plurality of magnets 510a and 520a, respectively, may be disposed on the substrate 600 and be mounted on the housing 120.

The plurality of magnets 510a and 520a may be moved in the direction perpendicular to the optical axis (the Z axis) together with the lens holder 320, while the plurality of driving coils 510b and 520b may be fixed to the housing 120. However, according to another example, positions of the plurality of magnets 510a and 520a and the plurality of driving coils 510b and 520b may be exchanged with each other.

In the examples described herein, a closed loop control manner of sensing and feeding back a position of the lens barrel 210 may be used in a hand-shake correction process. Therefore, the position calculating unit may be provided for closed loop control. The position calculating unit may detect the position of the lens barrel 210.

The camera module 100 may include a plurality of ball members supporting the hand-shake correction unit 500. The plurality of ball members may serve to guide movement of the frame 310, the lens holder 320, and the lens barrel 210 in the hand-shake correction process. In addition, the plurality of ball members may serve to maintain an interval between the carrier 300, the frame 310, and the lens holder 320.

The plurality of ball members may include first ball members B2 and second ball members B3. The first ball members B2 may guide movement of the frame 310, the lens holder 320, and the lens barrel 210 in the first axis (Y-axis) direction, and the second ball members B3 may guide movement of the lens holder 320 and the lens barrel 210 in the second axis (X-axis) direction.

As an example, the first ball members B2 may be moved in a rolling motion in the first axis (Y-axis) direction when driving force is generated in the first axis (Y-axis) direction. Therefore, the first ball members B2 may guide the movement of the frame 310, the lens holder 320, and the lens barrel 210 in the first axis (Y-axis) direction. In addition, the second ball members B3 may be moved in a rolling motion in the second axis (X-axis) direction when driving force is generated in the second axis (X-axis) direction. Therefore, the second ball members B3 may guide the movement of the lens holder 320 and the lens barrel 210 in the second axis (X-axis) direction.

The first ball members B2 may include a plurality of ball members disposed between the carrier 300 and the frame 310, and the second ball members B3 may include a plurality of ball members disposed between the frame 310 and the lens holder 320.

In surfaces of the carrier 300 and the frame 310 facing each other in the optical axis (Z-axis) direction, first guide groove portions 301 may be formed to accommodate the first ball members B2 therein. The first guide groove portions 301 may include a plurality of guide grooves corresponding to the plurality of ball members of the first ball members B2. The first ball members B2 may be accommodated in the first guide groove portions 301 and be fitted between the carrier 300 and the frame 310. Movement of the first ball members B2 may be restricted in the optical axis (Z-axis) direction and the second axis (X-axis) direction and the first ball members B2 may be moved in only the first axis (Y-axis) direction, in a state in which the first ball members B2 are accommodated in the first guide groove portions 301. As an example, the first ball members B2 may be moved in a rolling motion in only the first axis (Y-axis) direction. To this end, a planar shape of each of the plurality of guide grooves of the first guide groove portions 301 may be a rectangular shape having a length in the first axis (Y-axis) direction.

In surfaces of the frame 310 and the lens holder 320 facing each other in the optical axis (Z-axis) direction, second guide groove portions 311 may be formed to accommodate the second ball members B3 therein. The second guide groove portions 311 may include a plurality of guide grooves corresponding to the plurality of ball members of the second ball members B3.

The second ball members B3 may be accommodated in the second guide groove portions 311 and be fitted between the frame 310 and the lens holder 320. Movement of the second ball members B3 may be restricted in the optical axis (Z-axis) direction and the first axis (Y-axis) direction and the second ball members B3 may be moved in only the second axis (X-axis) direction, in a state in which the second ball members B3 are accommodated in the second guide groove portions 311. As an example, the second ball members B3 may be moved in a rolling motion in only the second axis (X-axis) direction. To this end, a planar shape of each of the plurality of guide grooves of the second guide groove portions 311 may be a rectangular shape having a length in the second axis (X-axis) direction.

Meanwhile, in the examples described herein, third ball members B4 supporting movement of the lens holder 320 may be provided between the carrier 300 and the lens holder 320. The third ball members B4 may guide both movement of the lens holder 320 in the first axis (Y-axis) direction and movement of the lens holder 320 in the second axis (X-axis) direction.

As an example, the third ball members B4 may be moved in a rolling motion in the first axis (Y-axis) direction when driving force is generated in the first axis (Y-axis) direction. Therefore, the third ball members B4 may guide the movement of the lens holder 320 in the first axis (Y-axis) direction. In addition, the third ball members B4 may be moved in a rolling motion in the second axis (X-axis) direction when driving force is generated in the second axis (X-axis) direction. Therefore, the third ball members B4 may guide the movement of the lens holder 320 in the second axis (X-axis) direction. The second ball members B3 and the third ball members B4 may be in contact with and support the lens holder 320.

In surfaces of the carrier 300 and the lens holder 320 facing each other in the optical axis (Z-axis) direction, third guide groove portions 302 may be formed to accommodate the third ball members B4 therein. The third ball members B4 may be accommodated in the third guide groove portions 302 to be inserted between the carrier 300 and the lens holder 320. While the third ball members B4 are accommodated in the third guide groove portions 302, movement of the third ball members B4 may be restricted in the optical axis (Z-axis) direction and the third ball members B4 may be moved in a rolling motion in the first axis (Y-axis) direction and the second axis (X-axis) direction. To this end, a planar shape of each of the third guide groove portions 302 may be a circular shape. Therefore, the third guide groove portions 302 may have a planar shape different from that of the first and second guide groove portions 301 and 311.

The first ball members B2 may be movable in the rolling motion in the first axis (Y-axis) direction, the second ball members B3 may be movable in the rolling motion in the second axis (X-axis) direction, and the third ball members B4 may be movable in the rolling motion in the first axis (Y-axis) direction and the second axis (X-axis) direction. Therefore, the plurality of ball members supporting the hand-shake correction unit 500 in the examples described herein may have a difference in a degree of freedom. Here, the degree of freedom refers to the number of independent variables required for representing a motion state of an object in a three-dimensional (3D) coordinates system. Generally, in the 3D coordinate system, a degree of freedom of the object may be 6. Movement of the object may be represented by an orthogonal coordinate system having three directions and a rotary coordinate system having three directions. As an example, in the 3D coordinate system, the object may be moved in a translation motion along the respective axes (the X axis, the Y axis, and the Z axis), and may be moved in a rotation motion in relation to the respective axes (the X axis, the Y axis, and the Z axis).

As described herein, the degree of freedom refers to the number of independent variables required for representing movement of the first ball members B2, the second ball members B3, and the third ball members B4 when the hand-shake correction unit 500 is moved by the driving force generated in the direction perpendicular to the optical axis (the Z axis) by applying electric power to the hand-shake correction unit 500. As an example, the third ball members B4 may be moved in the rolling motion along two axes (the first axis (the Y axis) and the second axis (the X axis)), and the first ball members B2 and the second ball members B3 may each be moved in the rolling motion along one axis (the first axis (the Y axis) or the second axis (the X axis)), by the driving force generated in the direction perpendicular to the optical axis (the Z axis). Therefore, the degree of freedom of the third ball members B4 may be greater than the degree of freedom of the first ball members B2 and the second ball members B3.

When the driving force is generated in the first axis (Y-axis) direction, the frame 310, the lens holder 320, and the lens barrel 210 may be moved together in the first axis (Y-axis) direction. Here, the first ball members B2 and the third ball members B4 may be moved in the rolling motion along the first axis (the Y-axis). In this case, the movement of the second ball members B3 may be restricted.

In addition, when the driving force is generated in the second axis (X-axis) direction, the lens holder 320 and the lens barrel 210 may be moved in the second axis (X-axis) direction. Here, the second ball members B3 and the third ball members B4 may be moved in the rolling motion along the second axis (the X-axis). In this case, the movement of the first ball members B2 may be restricted.

On the other hand, a plurality of yokes 510c and 520c may be provided so that the hand-shake correction unit 500 and the first to third ball members B2, B3, and B4 remain in contact with each other. The plurality of yokes 510c and 520c may be fixed to the carrier 300, and may be disposed to face the plurality of magnets 510a and 520a, respectively, in the optical axis (Z-axis) direction. Therefore, attractive force may be generated in the optical axis (Z-axis) direction between the plurality of yokes 510c and 520c and the plurality of magnets 510a and 520a. Since the hand-shake correction unit 500 is pressed toward the plurality of yokes 510c and 520c by the attractive force between the plurality of yokes 510c and 520c and the plurality of magnets 510a and 520a, the frame 310 and the lens holder 320 of the hand-shake correction unit 500 may be maintained in a state in which they are in contact with the corresponding first to third ball members B2, B3, and B4, while the first and third ball members B2 and B4 may be maintained in a state in which they are in contact with the carrier 300. The plurality of yokes 510c and 520c may be formed of a material that may generate the attractive force between the plurality of yokes 510c and 520c and the plurality of magnets 510a and 520a. As an example, the plurality of yokes 510c and 520c may be formed of a magnetic material.

In the examples described herein, the plurality of yokes 510c and 520c may be provided so that the frame 310 and the lens holder 320 may be maintained in the state in which they are in contact with the corresponding first to third ball members B2, B3, and B4, and a stopper 330 may be provided in order to prevent the first to third ball members B2, B3, and B4, the frame 310, and the lens holder 320 from being externally separated from the carrier 300 due to external impact, or the like. The stopper 330 may be coupled to the carrier 300 to cover at least a portion of an upper surface of the lens holder 320.

Figure 3:
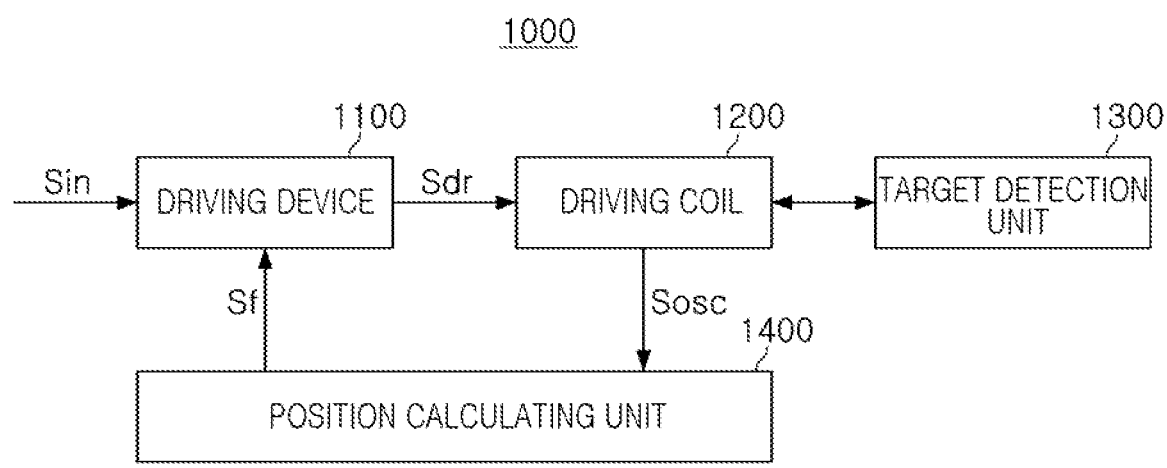
FIG. 3 is a block diagram illustrating an actuator used in the camera module according to one or more examples.

FIG. 3 is a block diagram illustrating an actuator used in the camera module according to one or more examples described herein. An actuator 1000 according to an example of FIG. 3 may correspond to one or both of an example of the focusing unit 400 and an example of the hand-shake correction unit 500 in FIG. 2.

When the actuator 1000 in FIG. 3 corresponds to the focusing unit 400 in FIG. 2, the actuator 1000 may move the lens barrel in an optical axis direction to perform an autofocusing (AF) function of the camera module. Therefore, when the actuator 1000 in FIG. 3 performs the autofocusing function, a driving device 1100 may apply a driving signal to a driving coil 1200 to provide driving force in the optical axis direction to the lens barrel.

When the actuator 1000 in FIG. 3 corresponds to the hand-shake correction unit 500 in FIG. 2, the actuator 1000 may move the lens barrel in the direction perpendicular to the optical axis in order to perform an optical image stabilization (OIS) function of the camera module. Therefore, when the actuator 1000 of FIG. 3 performs the optical image stabilization function, the driving device 1100 may apply the driving signal to the driving coil 1200, for example, driving coils 510b and 520b as described above with reference to FIG. 2, to provide driving force in the direction perpendicular to the optical axis to the lens barrel. For example, the driving force in the direction perpendicular to the optical axis may be a resultant of a driving force provided in the first axis (Y-axis) direction and a driving force provided in the second axis (X-axis) direction.

The actuator 1000 in the examples described herein may include the driving device 1100, the driving coil 1200, a target detection unit 1300, and a position calculating unit 1400.

The driving device 1100 may generate a driving signal Sdr depending on an input signal Sin, applied from an external source, and a feedback signal Sf, generated from the position calculating unit 1400, and may provide the generated driving signal Sdr to the driving coil 1200.

When the driving signal Sdr provided from the driving device 1100 is applied to the driving coil 1200, the lens barrel may move in the optical axis direction or the direction perpendicular to the optical axis by electromagnetic interaction between the driving coil 1200 and a magnet. As an example, the driving signal Sdr may be provided to the driving coil 1200 in one of current and voltage forms.

The position calculating unit 1400 may calculate a position of the target detection unit 1300 according to a frequency of an oscillation signal Sosc obtained from a driving coil. The position calculating unit 1400 may calculate displacement of the lens barrel through the calculation of the position of the target detection unit 1300.

A frequency of the oscillation signal Sosc obtained from the driving coil 1200 is variable depending on a position of the target detection unit 1300.

The target detection unit 1300 is formed of one of a magnetic material and a conductor and is disposed within a magnetic range. As an example, the target detection unit 1300 may be disposed to oppose the driving coil 1200. The target detection unit 1300 may be provided on one side of the lens barrel to move in the same direction as a moving direction of the lens barrel. According to some embodiments, the target detection unit 1300 may be provided on at least one of a carrier and a plurality of frames coupled to the lens barrel, in addition to the lens barrel.

In the present example, the target detection unit 1300 may correspond to the magnet 410, 510*a*, or 520*a* (see FIG. 2) disposed to face the driving coil 1200. According to some embodiments, a separate component may be prepared to implement the target detection unit 1300.

When the target detection unit 1300 formed of one of a magnetic material and a conductor moves together with the lens barrel, inductance of the driving coil 1200 varies. For example, a frequency of the oscillation signal Sosc varies depending on the movement of the target detection unit 1300.

The position calculating unit 1400 may calculate a position of the target detection unit 1300 to generate a feedback signal Sf and to transmit the feedback signal Sf to the driving device 1100.

When the feedback signal Sf is provided to the driving device 1100, the driving device may regenerate a driving signal Sdr, compared with the input signal Sin and the feedback signal Sf. For example, the driving device 1100 may be driven in a closed loop type to compare the input signal Sin and the feedback signal Sf with each other. The driving device 1100 of the closed loop type may be driven in a direction to reduce an error between a target position of the target detection unit 1300 included in the input signal Sin and a current position of the magnet 1300 included in the feedback signal Sf. Compared with open loop type driving, closed loop type driving results in advantages such as improvement in linearity, accuracy, and repeatability.

Figure 4:
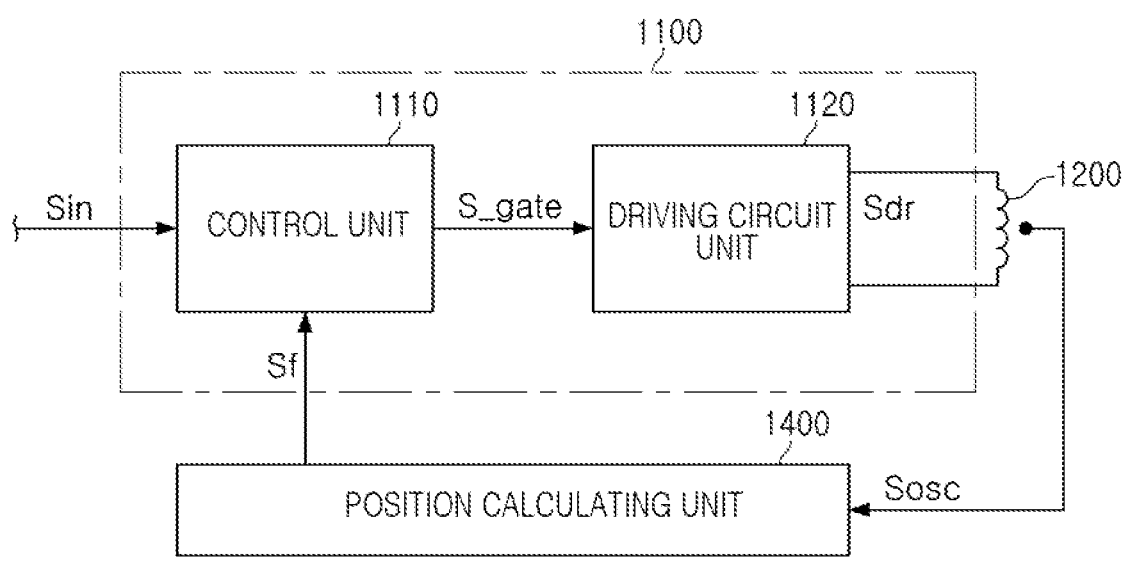
FIG. 4 is a block diagram illustrating example main units of an actuator of FIG. 3 in more detail.

FIG. 4 is a block diagram illustrating example main units of an actuator in FIG. 3 in more detail.

Referring to FIG. 4, the driving device 1100 in the examples disclosed herein may include a control unit 1110 and a driving circuit unit 1120. The driving device in FIG. 4 may be implemented by a driver integrated circuit (IC).

The control unit 1110 may generate a control signal S_gate from the input signal Sin and the feedback signal Sf provided from the position calculating unit 1400. For example, the control unit 1110 may compare the input signal Sin indicating a target position of the lens barrel and the feedback signal Sf indicating a current position of the lens barrel with each other to generate the control signal S_gate.

The driving circuit unit 1120 may generate the driving signal Sdr depending on the control signal S_gate, and provide the driving signal to the driving coil 1200. The driving signal Sdr may be provided in one of current and voltage forms to both ends of the driving coil 1200. The lens barrel may move to the target position by the driving signal Sdr generated by the driving circuit unit 1120 and provided to the driving coil 1200.

The driving circuit unit 1120 may include an H bridge circuit bi-directionally driven by the control signal S_gate to apply the driving signal Sdr to the driving coil 1200. The H bridge circuit may include a plurality of transistors connected to both ends of the driving coil 1200 in an H bridge form. When the driving circuit unit 1120 is driven in a voice coil motor manner, the control signal S_gate provided from the controlling unit 1120 may be applied to gates of the transistors included in the H bridge circuit.

Figure 5:
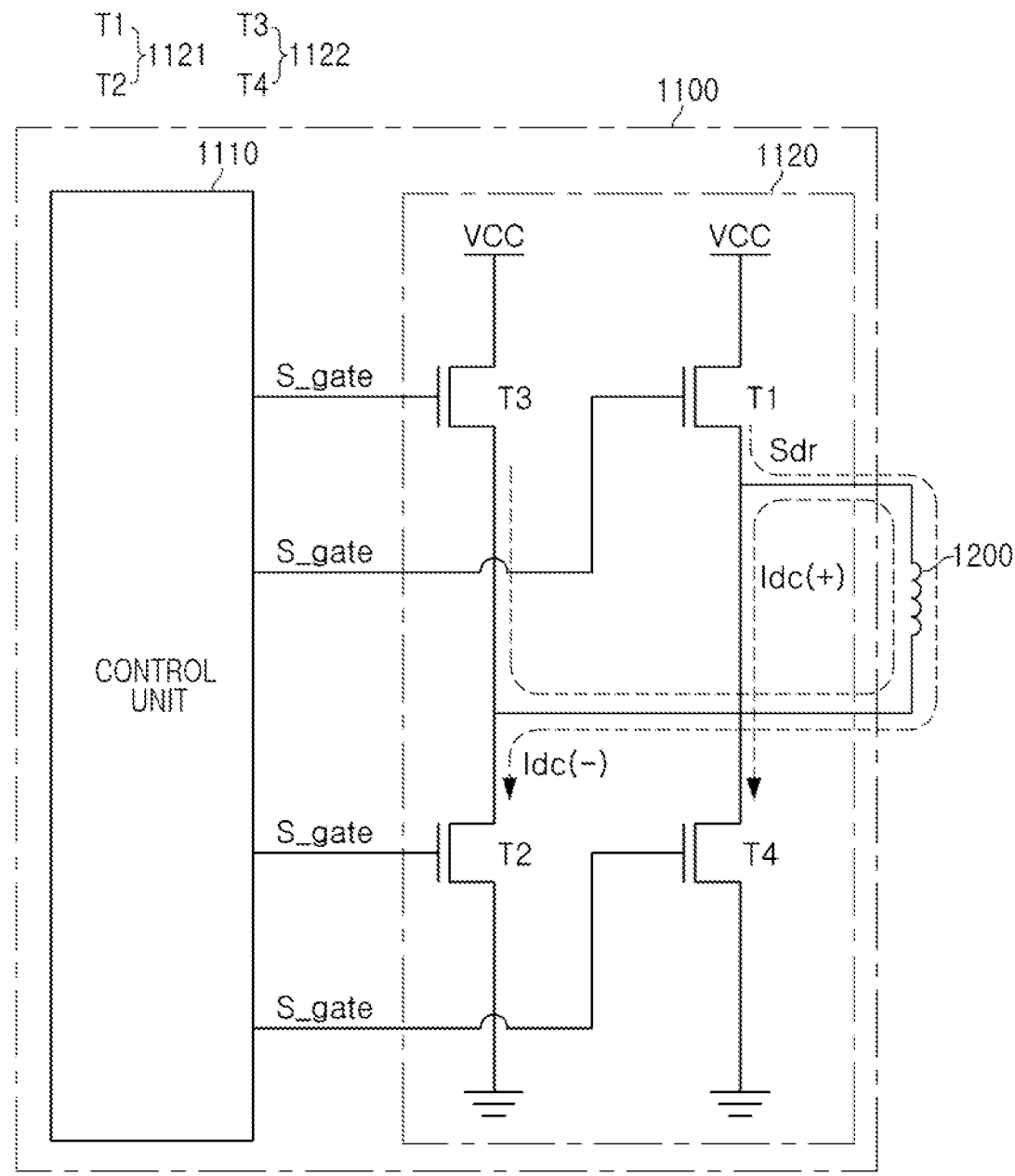
FIG. 5 is a circuit diagram illustrating an example driving circuit unit of a driving device of FIG. 4 in detail.

FIG. 5 is a circuit diagram illustrating an example driving circuit unit of a driving device in FIG. 4 in detail.

Referring to FIG. 5, the driving circuit unit 1120 may include a plurality of transistors T1, T2, T3, and T4 connected to the driving coil 1200 in an H bridge form. In detail, the driving circuit unit 1120 may include a first path transistor unit 1121 and a second path transistor unit 1122. A first path current Idc(−) flows due to the first path transistor unit 1121, and a second path current Idc(+) flows due to the second path transistor 1122.

The first path transistor unit 1121 may include a first transistor T1 and a second transistor T2. The first transistor T1 may be disposed between a driving power supply Vcc and one end of the driving coil 1200, and the second transistor T2 may be disposed between the other end of the driving coil 1200 and a ground.

The first path transistor unit 1121 may form a first path of the driving signal Sdr applied to the driving coil 1200 depending on the control signal S_gate provided from the control unit 1110. As an example, the control signal S_gate may be provided to gates of the first transistor T1 and the second transistor T2. As an example, when the control signal S_gate is in a high level, the first transistor T1 and the second transistor T2 may be turned on, and when the control signal S_gate is in a low level, the first transistor T1 and the second transistor T2 may be turned off. According to some embodiments, different control signals are provided to the first and second transistors T1 and T2 in such a manner that both the first and second transistors T1 and T2 are turned on, and one of the first and second transistors T1 and T2 adjust the amount of current flowing through the first path.

The second path transistor unit 1122 may include a third transistor T3 and a fourth transistor T4. The third transistor T3 may be disposed between the driving power supply Vcc and the other end of the driving coil 1200, and the fourth transistor T4 may be disposed between the one end of the driving coil 1200 and the ground.

The second path transistor unit 1122 may form a second path of the driving signal Sdr applied to the driving coil 1200 depending on the control signal S_gate provided from the control unit 1110. As an example, the control signal S_gate may be provided to gates of the third transistor T3 and the fourth transistor T4. As an example, when the control signal S_gate is in a high level, the third and fourth transistors T3 and T4 may be turned on, and when the control signal S_gate is in a low level, the third and fourth transistors T3 and T4 may be turned off. According to some embodiments, different control signals are provided to the third and fourth transistors T3 and T4 in such a manner that both the third and fourth transistors T3 and T4 are turned on, and one of the third and fourth transistors T3 and T4 adjust the amount of current flowing through the second path.

The first path transistor unit 1121 and the second path transistor unit 1122 may form different paths of the driving signal Sdr applied to the driving coil 1200. As an example, an operation section of the first path transistor unit 1121 may be the same as a non-operation section of the second path transistor unit 1122, and a non-operation section of the first path transistor unit 1121 may be the same an operation section of the second path transistor unit 1122.

It will be understood that the operation sections refer to sections in which transistors of the first path transistor unit 1121 and the second path transistor unit 1122 are turned on, and the non-operation sections refer to sections which the transistors of the first path transistor unit 1121 and the second path transistor unit 1122 are turned off.

For example, the first path transistor unit 1121 and the second path transistor unit 1122 may be selectively operated depending on the control signal S_gate provided from the control unit 1110. In the operation section of the first path transistor unit 1121, the first transistor T1 and the second transistor T2 of the first path transistor unit 1121 may be turned on, and in the non-operation section of the second path transistor unit 1122, the third transistor T3 and the fourth transistor T4 of the second path transistor unit 1122 may be turned off. In addition, in the non-operation section of the first path transistor unit 1121, the first transistor T1 and the second transistor T2 of the first path transistor unit 1121 may be turned off, and in the operation section of the second path transistor unit 1122, the third transistor T3 and the fourth transistor T4 of the second path transistor unit 1122 may be turned on.

Figure 6:
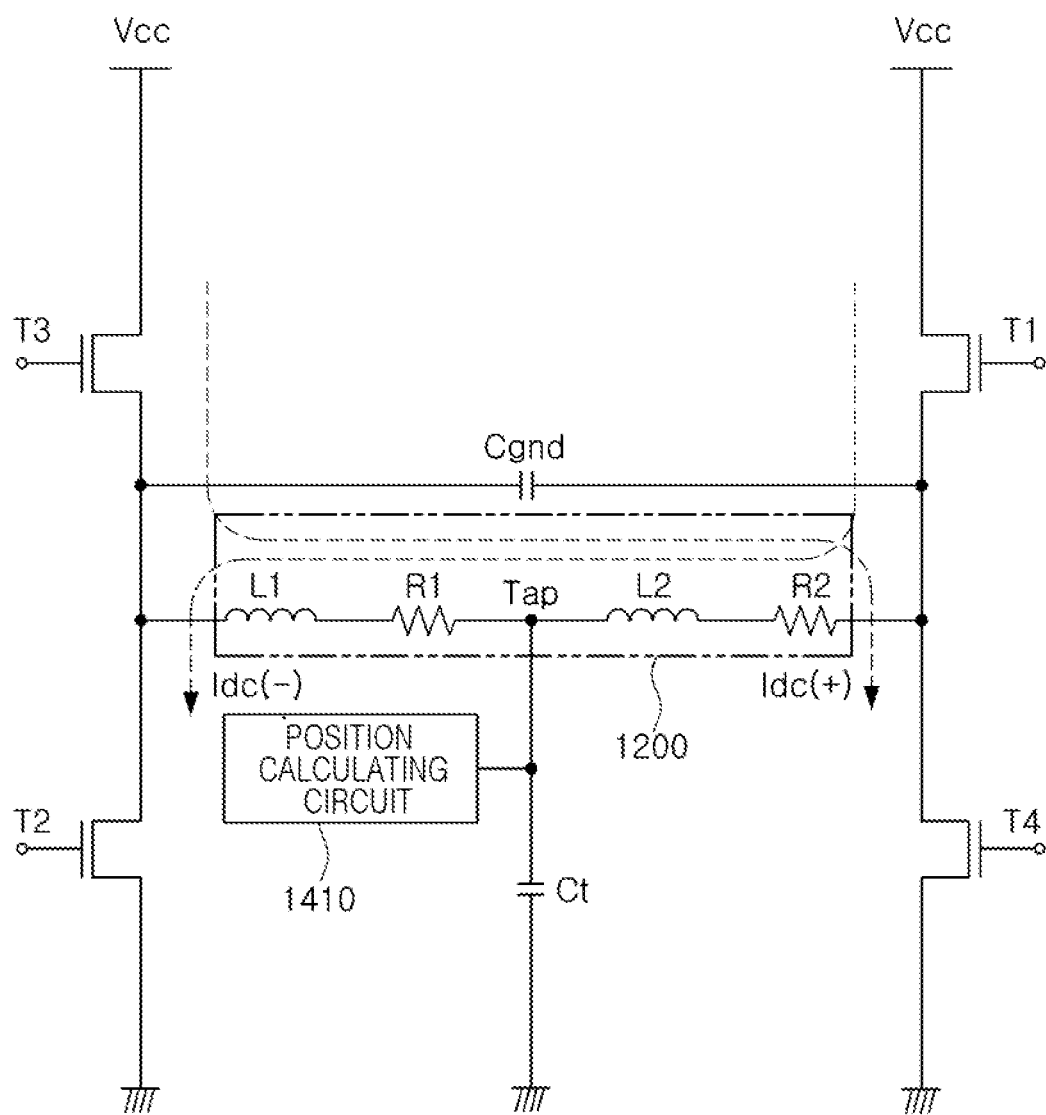
FIG. 6 is a circuit diagram illustrating an example driving circuit unit and an example position calculating unit according to one or more examples.

FIG. 6 is a circuit diagram illustrating an example driving circuit unit and an example position calculating unit according to one or more examples described herein. In FIG. 6, a driving coil 1200 is illustrated as an equivalent circuit including a first inductor L1, a second inductor L2, a first resistor R1, and a second resistor R2 connected in series. The first resistor R1 and the second resistor R2 may correspond to equivalent resistor components of the driving coil 1200 or parasitic resistor components of a branch in which the driving coil 1200 is disposed.

Referring to FIG. 6, a position calculating unit 1400 according to an example includes a first capacitor Cgnd disposed in parallel with the driving coil 1200, a second capacitor Ct disposed between a tap terminal Tap of the driving coil 1200 and a ground, and a position calculating circuit 1410 connected to a node between the tap terminal of the driving coil 1200 and the second capacitor Ct. The tap terminal Tap of the driving coil 1200 may refer to one point of winding constituting the driving coil 1200.

Figure 7:
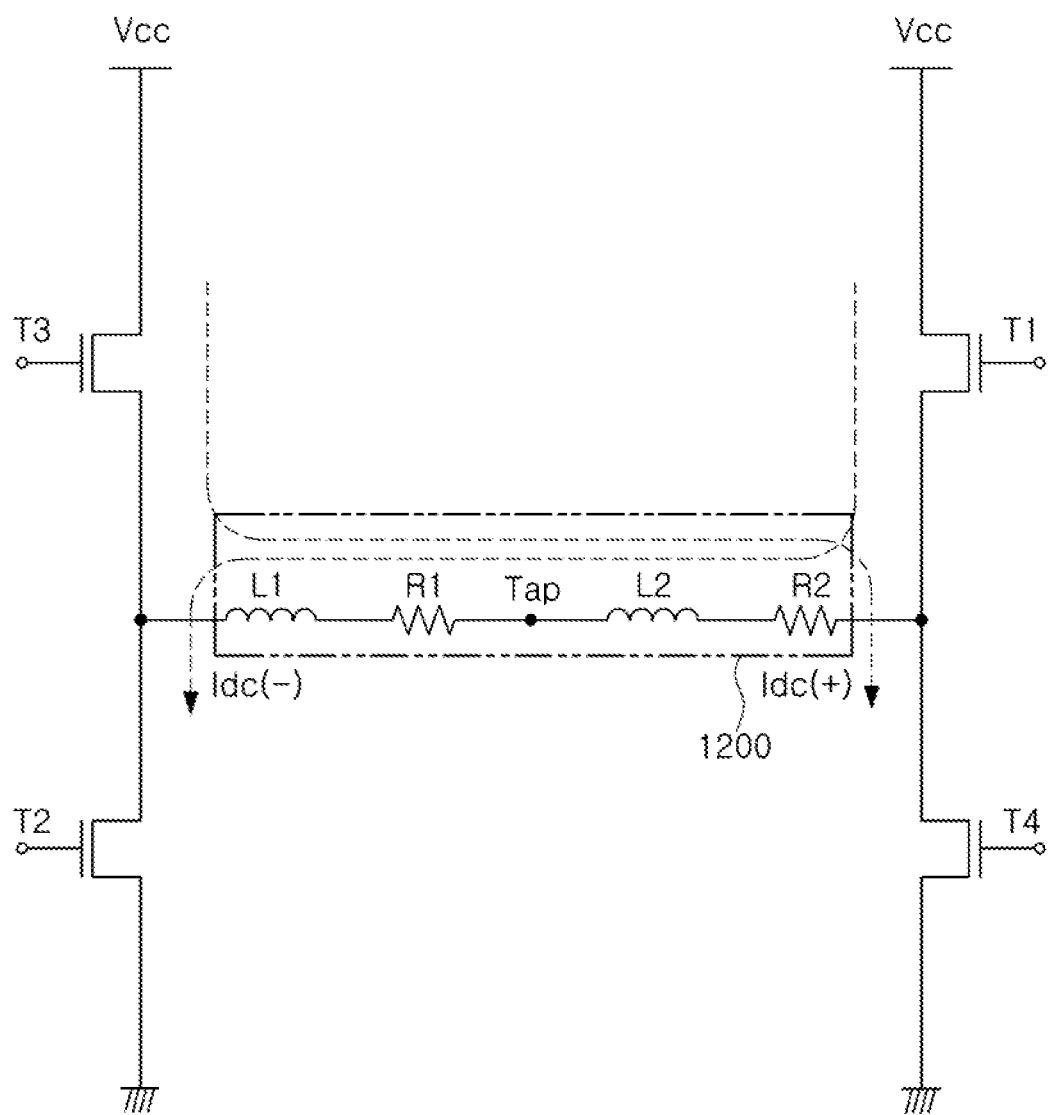
FIG. 7 illustrates an example of an equivalent circuit of a circuit of FIG. 6 for a DC signal.

FIG. 7 illustrates an example of an equivalent circuit of a circuit of FIG. 6 for a DC signal. The equivalent circuit of a circuit of FIG. 6 for a DC signal may be understood as an equivalent circuit of FIG. 6 in the case in which a DC signal is provided as a gate control signal driving transistors of a driving circuit unit.

A high-level DC signal is provided to a first transistor T1 and a second transistor T2 as a gate control signal, and a low-level DC signal is provided to a third transistor T3 and a fourth transistor T4 as a gate control signal. When a first path current Idc(−) flows due to the high-level DC signal and the low-level DC signal, the first transistor T1 may be turned on and the amount of the first path current Idc(−) may be determined depending on a voltage provided to a gate of the second transistor T2. A low-level DC signal is provided to the first transistor T1 and the second transistor T2 as a gate control signal, and a high-level DC signal is provided to the third transistor T3 and the fourth transistor T4 as a gate control signal. When a second path current Idc(+) flows due to the low-level DC signal and the high-level DC signal, the third transistor T3 may be turned on and the amount of the second path current Idc(+) may be determined depending on a voltage provided to a gate of the fourth transistor T4.

For the DC signal, a first capacitor Cgnd and a second capacitor Ct of a position calculating unit are equivalent to an open circuit. Accordingly, components of the position calculating unit may not affect an operation of the driving circuit unit 1120.

FIGS. 8 to 11 are example equivalent circuits of a circuit of FIG. 6 for an AC signal. The AC signal will be understood as an oscillation signal output by an oscillation circuit to be described later. Therefore, the equivalent signal of a circuit of FIG. 6 for an AC signal will be understood as an equivalent circuit of FIG. 6.

Figure 8:
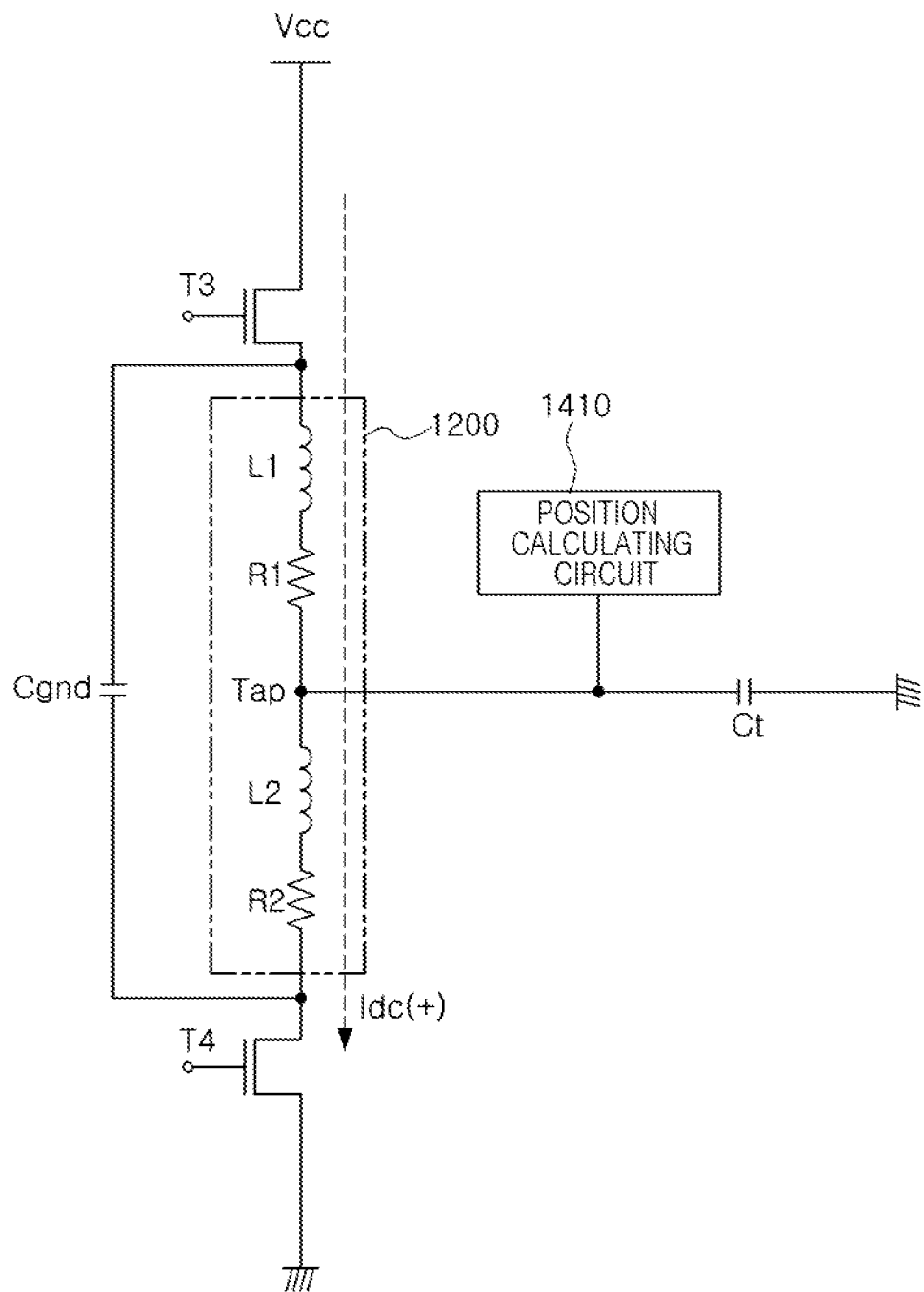
FIGS. 8, 9, 10, and 11 are example equivalent circuits of a circuit of FIG. 6 for an AC signal.

To describe the equivalent circuit of FIG. 6 for an AC signal, it will be assumed that the first transistor T1 and the second transistor T2 are turned off. Under the assumption, the circuit of FIG. 6 may be equivalent to that of FIG. 8. In FIG. 8, the third transistor T3 may be turned on and the amount of the second path current Idc(+) may be determined according to a voltage provided to the gate of the fourth transistor T4. Thus, the second path current Idc(+) may flow to the driving coil 1200.

In this case, since the third transistor T3 has significantly low equivalent resistance when the third transistor T3 is turned on, the third transistor T3 is equivalent to a short-circuit. Thus, both terminals of the third transistor T3 are maintained in a ground state. For example, both terminals of the third transistor T3 may function as a ground AC GND for an AC signal.

On the other hand, the fourth transistor T4 is equivalent to an open circuit when the second path current Idc(+) is close to zero (0). Meanwhile, the fourth transistor T4 is equivalent to a short circuit when the second path current Idc(+) is close to a maximum, and thus, both end terminals of the fourth transistors T4 are maintained in a ground state for the AC signal.

The first capacitor Cgnd connected to both ends of the driving coil 1200 is equivalent to a short circuit for the AC signal. Thus, the first capacitor Cgnd may provide a ground signal AC GND, for the AC signal, to both ends of the driving coil 1200 due to the AC signal. As a result, the circuit of FIG. 8 may be equivalent to the circuit of FIG. 9, irrespective of the amount of the second path current Idc(+). As illustrated in FIG. 8, the first capacitor Cgnd is connected in parallel to both ends of the driving coil 1200. However, it is a matter of course that two first capacitors Cgnd are provided, and one of the two capacitors Cgnd is connected between one end of the driving coil 1200 and a ground and the other capacitor Cgnd is connected between the other end of the driving coil 1200 and the ground.

On the basis of a tap terminal Tap of the driving coil 1200, a first inductor L1 and a second inductor L2 of the driving coil 1200, connected in parallel, are equivalent to an inductor L(=(L1\*L2)/(L1+L2)).

The capacitor Ct may be expressed as Equation (1) below. Referring to Equation (1), the capacitor Ct may be expressed as a capacitor C1 viewed from the first inductor L1, a capacitor C2 viewed from the second inductor L2, and a parasitic capacitor CP.

$$Ct = C1 + C2 + Cp \quad \text{Equation (1)}$$

On the basis of the tap terminal Tap of the driving coil 1200, a first resistor R1 and a second resistor R2, connected in parallel, may be equivalent to a resistor Rp according to Equation (2) below.

$$Rp1 = \frac{1}{R1}\frac{L1}{C1}, \quad Rp2 = \frac{1}{R2}\frac{L2}{C2} \quad \text{Equation (2)}$$
$$Rp = Rp1 \,//\, Rp2$$

Figure 9:
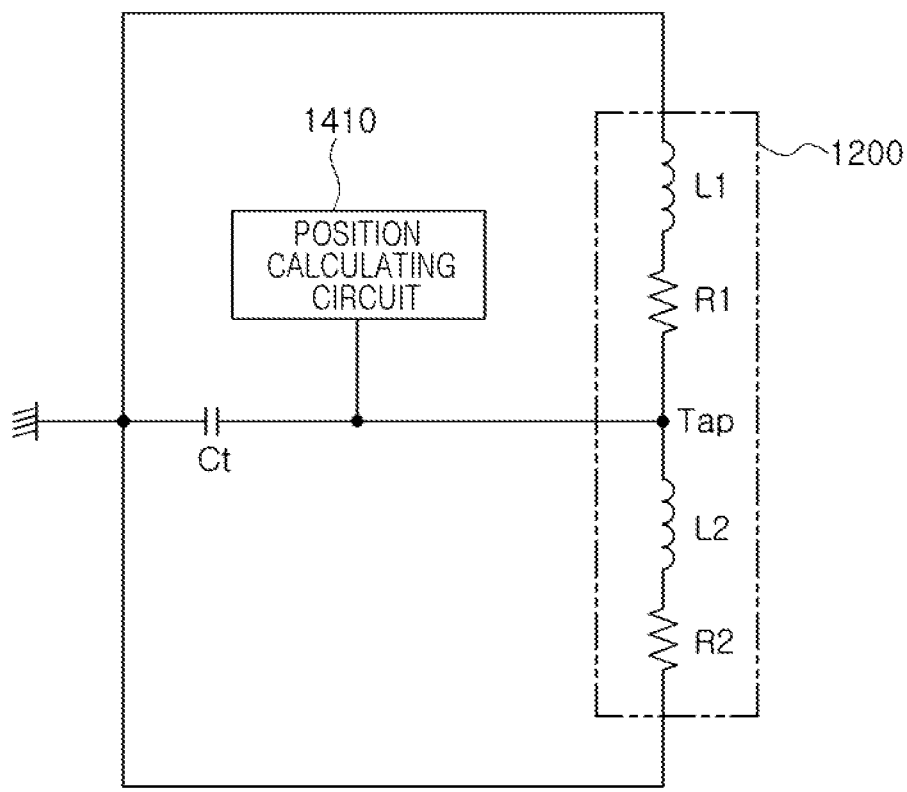
Figure 10:
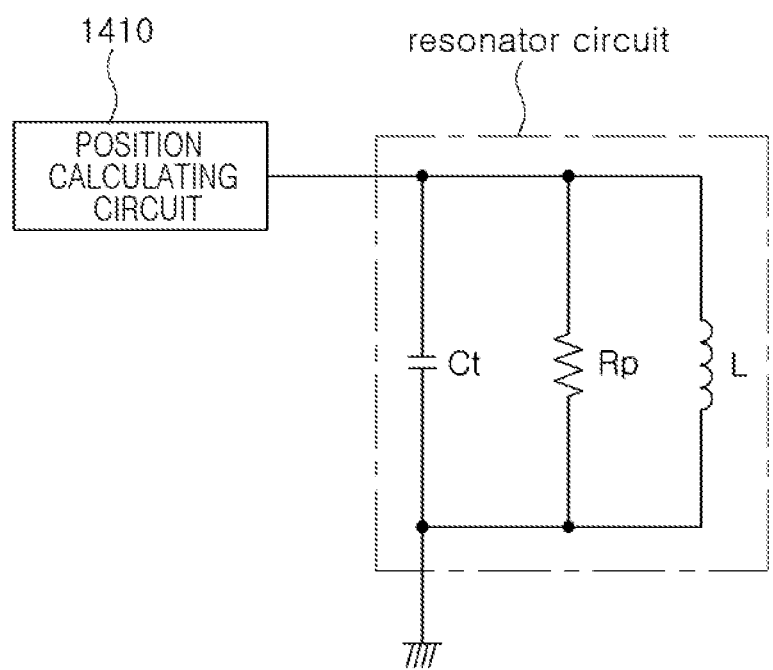

Accordingly, a circuit of FIG. 9 may be equivalent to a circuit of FIG. 10. In this case, an oscillation frequency of an oscillation circuit including a capacitor Ct, a resistor Rp, and an inductor L is expressed as Equation (3). For ease of description, the capacitor Ct, the resistor Rp, and the inductor L, connected in parallel, will be hereinafter referred to as an oscillation circuit.

$$f = \frac{1}{2\pi\sqrt{L*Ct}} \quad \text{Equation (3)}$$

Figure 11:
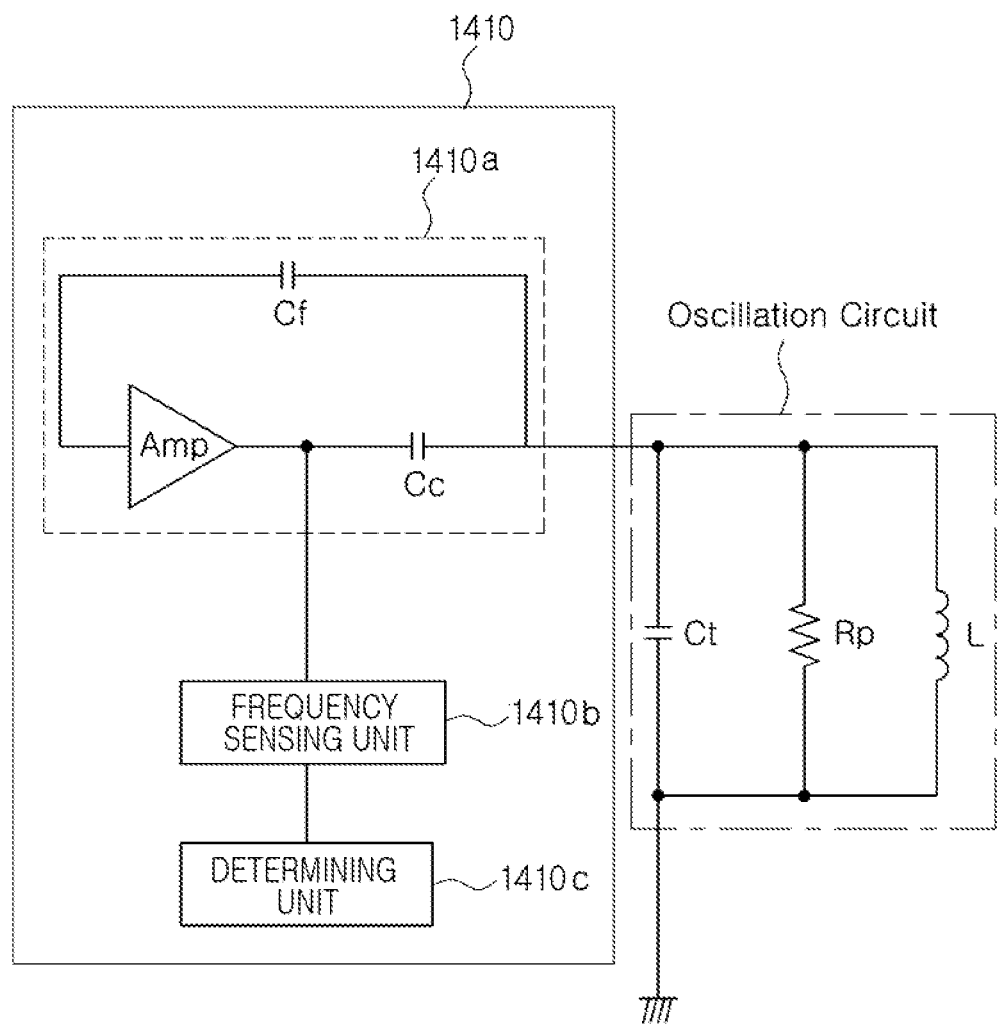

FIG. 11 is a block diagram illustrating an example position calculating circuit in detail.

The position calculating circuit 1410 may include an oscillation maintaining unit 1410a, a frequency sensing unit 1410b, and a determining unit 1410c.

The oscillation maintaining unit 1410a may include an amplifier Amp, a capacitor Cf, and a capacitor Cc. One end of the capacitor Cc is connected to an output terminal of the amplifier Amp, and the capacitor Cf is connected between the other end of the capacitor Cc and the input terminal of the amplifier Amp.

The oscillation maintaining unit 1410a compensates for energy loss, caused by a resistor Rp, to maintain oscillation, for example, LC oscillation, occurring due to the inductor L and the capacitor Ct of the oscillation circuit. In this case, a transconductance gain gm of the amplifier Amp for maintaining oscillation satisfies Equation 4 below.

$$gm \geq 1/Rp \quad \text{Equation (4)}$$

When a distance between the target detection unit 1300 and the inductor L is changed in the state in which oscillation is maintained, inductance of the inductor L varies and a frequency of an oscillation signal output by an oscillation circuit also varies. In this case, the oscillation of the oscillation circuit may occur in the tap terminal Tap of the driving coil 1200 even when a current flows in any one direction of the first path current Idc(−) and the second path current Idc(+).

Accordingly, the position calculating unit 1400 may calculate a position of a lens barrel according to a frequency variation of the oscillation signal depending on the variation of the inductance of the driving coil.

The oscillation signal output by the oscillation circuit may be input to the amplifier Amp through the capacitor Cf, and the amplifier Amp may amplify the input oscillation signal and may output the amplified oscillation signal through the capacitor Cc to maintain the oscillation of the oscillation circuit. The amplified oscillation signal may be input to the frequency sensing unit 1410b, and the frequency sensing unit 1410b may obtain frequency information of the oscillation signal.

Figure 12:
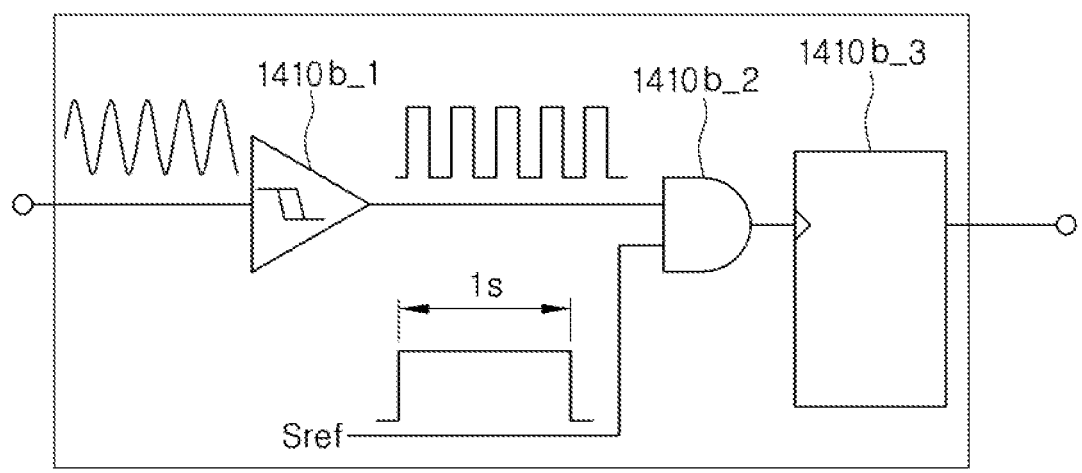
FIG. 12 is a block diagram illustrating a frequency sensing unit according to one or more examples.

FIG. 12 is a block diagram illustrating an example frequency sensing unit according to one or more examples described herein.

Referring to FIG. 12, a frequency sensing unit 1410b may include a comparator 1410b_1, an AND gate 1410b_2, and a latch 1410b_3.

The comparator 1410b_1 converts an oscillation signal into a pulse signal and provides the pulse signal to the AND gate 1410b_2. As an example, the comparator 1410b_1 may be implemented using a Schmitt trigger circuit. The AND gate 1410_2 logically ANDs the pulse signal, input from the comparator 1410b_1, and a reference period signal Sref to provide a logical AND signal to the latch 1410b_3. As an example, the reference period signal Sref may have a period of 1 second (1s). The latch 1410b_3 may count logical AND signals input from the AND gate 1410b_2 to obtain frequency information.

In another embodiment, the frequency sensing unit 1410b may count the oscillation signal using a reference clock CLK to calculate a frequency of the oscillation signal. The reference clock CLK is a clock signal having a significantly high frequency. For example, in the case in which an oscillation signal Sosc of one period is counted as a reference clock CLK during a reference period, a count value of the clock CLK corresponding to the oscillation signal of one period may be calculated. The frequency sensing unit 1410b may calculate the frequency of the oscillation signal using the count value of the reference clock CLK and the frequency of the reference clock CLK.

Returning to FIG. 11, the determining unit 1410c may receive the frequency of the oscillation signal from the frequency sensing unit 1410b and may determine a position of the target detection unit 1300 according to the frequency of the oscillation signal. The determining unit 1410c may include a memory, and position information of the target detection unit 1300 corresponding to the frequency of the oscillation signal may be stored in the memory. The memory may be implemented using a nonvolatile memory including one of a flash memory, an electrically erasable programmable read-only memory (EEPROM), and a ferroelectric RAM (FeRAM). Accordingly, when the frequency of the oscillation signal is transmitted, the determining unit 1410c may determine the position of the target detection unit 1300 based on the position information of the target detection unit 1300 stored in the memory.

Figure 13:
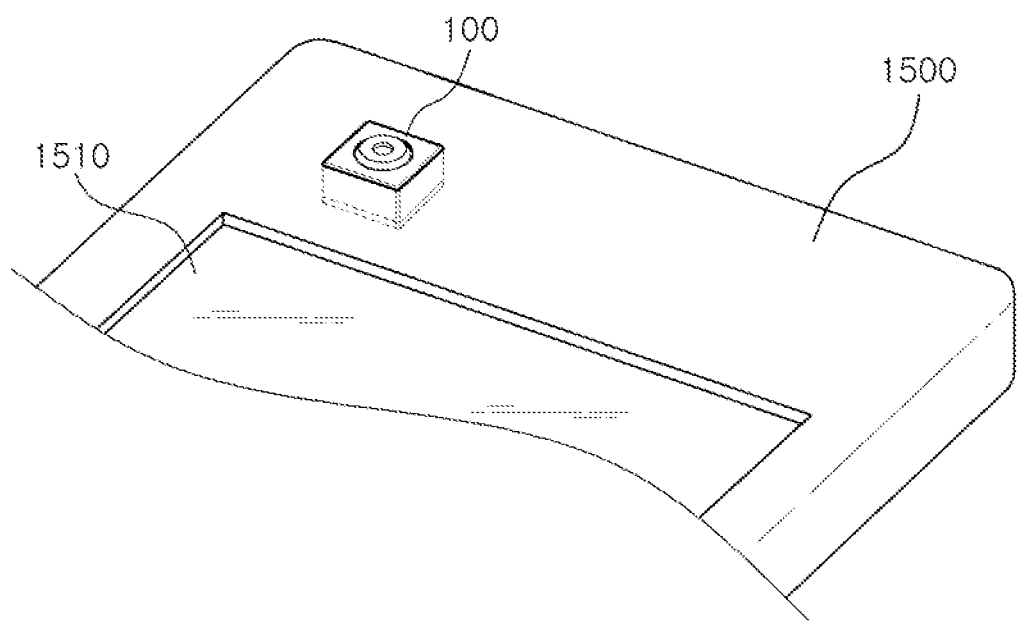
FIG. 13 is a perspective view illustrating one or more examples of a portable electronic device with an example camera module.

Referring to FIG. 13, the camera module 100, according to the examples described herein, may be a mobile device, such as a portable electronic device 1500, and further include a display unit 1510, wherein the camera module 100 is installed as a front camera of the portable electronic device 1500 along with the display unit 1510 or as a back camera on a side of the portable electronic device 1500 other than a side with the display unit 1510. As described in the various examples, an electrical signal converted by an image sensor 710 (FIG. 2) of the camera module 100 may be output as an image via the display unit 1510 of the portable electronic device 1500.

An actuator of a camera module in the examples described herein may precisely detect a position of a magnet from a variation in inductance of a driving coil. Further, since no separate Hall sensor is employed, manufacturing cost of the actuator of the camera module may be reduced and space efficiency may be improved.

As described above, since an actuator of a camera module in the examples described herein does not employ a separate Hall sensor, manufacturing cost of the actuator of the camera module may be reduced and space efficiency may be improved.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens barrel;
   a driving coil disposed to face a target detection unit disposed on one side of the lens barrel;
   a driving device configured to provide a driving signal to the driving coil; and
   a position calculating unit comprising a first capacitor comprising a ground for an alternating current (AC) signal to the driving coil, a second capacitor connected to the driving coil to constitute an oscillation circuit together with the driving coil, and a position calculating circuit configured to calculate a position of the lens barrel from a frequency of the oscillation circuit.

2. The camera module of claim 1, wherein the first capacitor is connected in parallel to the driving coil.

3. The camera module of claim 1, wherein the first capacitor comprises two first capacitors, and
   one of the two first capacitors is connected between one end of the driving coil and a ground, and the other first capacitor is connected between the other end of the driving coil and the ground.

4. The camera module of claim 1, wherein the second capacitor is disposed between a tap terminal of the driving coil and a ground.

5. The camera module of claim 1, wherein the position calculating circuit comprises an oscillation maintaining unit configured to maintain oscillation of the oscillation circuit.

6. The camera module of claim 5, wherein the oscillation circuit comprises a resistor component, an inductor component, and a capacitor component connected in parallel.

7. The camera module of claim 6, wherein the resistor component of the oscillation circuit corresponds to at least one of an equivalent resistor component of the driving coil and a parasitic resistor component of a branch in which the driving coil is disposed.

8. The camera module of claim 7, wherein the oscillation maintaining unit comprises an amplifier configured to amplify an oscillation signal of the oscillation circuit.

9. The camera module of claim 8, wherein the amplifier comprises a transconductance gain satisfying $gm \geq 1/Rp$,
   where gm denotes a transconductance gain, and Rp denotes the resistor component of the oscillation circuit.

10. A portable electronic device, comprising:
    the camera module of claim 1 further comprising an image sensor configured to convert light incident through the lens barrel to an electrical signal; and
    a display unit disposed on a surface of the portable electronic device to display an image based on the electrical signal.

11. A camera module comprising:
    a lens barrel;
    a driving coil disposed to face a target detection unit disposed on one side of the lens barrel;
    a driving device comprising a driving circuit unit comprising a plurality of transistors connected to the driving coil, and a control unit configured to provide a control signal to a gate of each of the plurality of transistors; and
    a position calculating unit comprising a first capacitor connected to the driving coil in parallel, and a second capacitor disposed between a tap terminal of the driving coil and a ground, the position calculating unit configured to calculate a position of the lens barrel according to a variation in inductance of the driving coil in response to movement of the target detection unit.

12. The camera module of claim 11, wherein the first capacitor comprises a ground for an alternating current (AC) signal to the driving coil.

13. The camera module of claim 11, wherein the first capacitor constitutes an oscillation circuit together with the driving coil.

14. The camera module of claim 13, wherein the position calculating unit detects a variation in inductance of the driving coil in response to a frequency of the oscillation circuit.

15. The camera module of claim 13, wherein the position calculating unit amplifies an oscillation signal of the oscillation circuit to maintain oscillation of the oscillation circuit.

16. The camera module of claim 11, wherein the plurality of transistors are connected to both ends of the driving coil in the form of an H bridge circuit.

17. The camera module of claim 11, wherein the position calculation unit calculates a position of the lens barrel in response to a variation in inductance of the driving coil in a period in which the control signal is applied to a gate of each of the plurality of transistors.

18. A portable electronic device, comprising:
    the camera module of claim 11 further comprising an image sensor configured to convert light incident through the lens barrel to an electrical signal; and
    a display unit disposed on a surface of the portable electronic device to display an image based on the electrical signal.

* * * * *